(12) United States Patent
Laks et al.

(10) Patent No.: US 7,885,883 B2
(45) Date of Patent: Feb. 8, 2011

(54) SYSTEMS AND METHODS FOR TRANSACTIONAL RISK REPORTING

(75) Inventors: David Laks, Passaic, NJ (US); Alexander Ginzburg, Larchmont, NY (US); Farid Khalili, Great Neck, NY (US); Charles Dlhopolsky, New York, NY (US)

(73) Assignee: Morgan Stanley, New York, NY (US)

( * ) Notice: Subject to any disclaimer, the term of this patent is extended or adjusted under 35 U.S.C. 154(b) by 853 days.

(21) Appl. No.: 10/857,751

(22) Filed: May 28, 2004

(65) Prior Publication Data

US 2005/0267832 A1   Dec. 1, 2005

(51) Int. Cl.
*G06Q 99/00* (2006.01)
(52) U.S. Cl. ...................... 705/36 R; 705/37
(58) Field of Classification Search ............... 705/35–40
See application file for complete search history.

(56) References Cited

U.S. PATENT DOCUMENTS

| | | | | |
|---|---|---|---|---|
| 5,630,127 A | | 5/1997 | Moore et al. | |
| 5,913,202 A | * | 6/1999 | Motoyama | 705/36 R |
| 5,991,743 A | | 11/1999 | Irving et al. | |
| 6,453,303 B1 | * | 9/2002 | Li | 705/36 R |
| 2003/0009408 A1 | | 1/2003 | Korin | |
| 2003/0130917 A1 | * | 7/2003 | Crovetto | 705/35 |
| 2003/0135495 A1 | * | 7/2003 | Vagnozzi | 707/3 |
| 2003/0236742 A1 | * | 12/2003 | Lawrence | 705/38 |

OTHER PUBLICATIONS

"Stochastic Volatility Model" Apr. 2001 www.cmis.csiro.au/zili.zhu/ModelDocuments/stochasticvolatility.doc.*

* cited by examiner

*Primary Examiner*—Thomas M Hammond, III
(74) *Attorney, Agent, or Firm*—K&L Gates LLP

(57) ABSTRACT

A system and method for accommodating financial risk calculations in a relational database schema is disclosed. The database schema scales to accommodate a variety of risk calculations by utilizing a name/value pair approach associated with a market factor. Risk calculation definitions are explicitly and unambiguously defined by associating risk numbers with market factors that have been perturbed while calculating them.

13 Claims, 4 Drawing Sheets

| Trade ID | Delta | Gamma | Kappa | Theta |
|---|---|---|---|---|
| 1001 | 0.3 | 0.34 | 0.73 | 0.12 |
| 1002 | 0.35 | 0.55 | 0.34 | 0.76 |
| 1003 | 0.42 | 0.71 | 0.22 | 0.63 |

| Trade ID | Delta | Gamma | Kappa |
|---|---|---|---|
| 1001 | 0.3 | 0.34 | 0.73 |
| 1002 | 0.35 | 0.55 | 0.34 |
| 1003 | 0.42 | 0.71 | 0.22 |

| Trade ID | Delta | Gamma | Kappa | Theta |
|---|---|---|---|---|
| 1001 | 0.3 | 0.34 | 0.73 | 0.12 |
| 1002 | 0.35 | 0.55 | 0.34 | 0.76 |
| 1003 | 0.42 | 0.71 | 0.22 | 0.63 |

FIG. 3C

| Trade ID | RiskType | Value | MarketFactorId |
|---|---|---|---|
| 1001 | Delta | 0.3 | 10001 |
| 1001 | Gamma | 0.34 | 10002 |
| 1001 | Kappa | 0.73 | 10003 |
| 1002 | Delta | 0.35 | 10001 |
| 1002 | Gamma | 0.55 | 10002 |
| 1002 | Kappa | 0.34 | 10003 |
| 1003 | Delta | 0.42 | 10001 |
| 1003 | Gamma | 0.71 | 10002 |
| 1003 | Kappa | 0.22 | 10003 |

FIG. 3D

| Trade ID | RiskType | Value | MarketFactorId |
|---|---|---|---|
| 1001 | Delta | 0.3 | 10001 |
| 1001 | Gamma | 0.34 | 10002 |
| 1001 | Kappa | 0.73 | 10003 |
| 1001 | Theta | 0.12 | 10004 |
| 1002 | Delta | 0.35 | 10001 |
| 1002 | Gamma | 0.55 | 10002 |
| 1002 | Kappa | 0.34 | 10003 |
| 1002 | Theta | 0.76 | 10004 |
| 1003 | Delta | 0.42 | 10001 |
| 1003 | Gamma | 0.71 | 10002 |
| 1003 | Kappa | 0.22 | 10003 |
| 1003 | Theta | 0.63 | 10004 |

SYSTEMS AND METHODS FOR TRANSACTIONAL RISK REPORTING

TECHNICAL FIELD

The present invention relates generally to database methods and systems and, more particularly, to database systems and techniques for transactional risk reporting.

BACKGROUND

Many financial services firms maintain a Fixed Income Division ("FID"). FIDs are increasingly booking products across disparate business units. For example, Commodities, Corporates, and Forex ("FX") (an over-the-counter "OTC" market where buyers and sellers conduct foreign exchange transactions) all maintain interest-rate swaps.

In a transaction or deal, certain market parameters may be tracked to determine, among other things, fair market value of the deal. The parameters may be interest rates, bond yields, values of similar deals and the like. These parameters are known as market observables. To value a particular transaction or deal, it may be necessary to identify a mathematical function based upon the observables such that a fair market value for the deal or transaction may be derived.

After determining a mathematical function to derive a value of a transaction or deal, it is often desirable to measure risk associated with the various investment instruments that comprise the transaction or deal. One method for determining the risk involved in a particular deal or transaction is to measure the sensitivity of the fair market value to the market observables. The sensitivity analysis may be computed by taking the partial derivative of the mathematical function representing the deal or transaction over the particular market observable, as is known in the art.

For a given transaction or deal there may be many sensitivities that need to be calculated and tracked. Common examples include: delta, the change in price of a call option for every one-point move in price of the underlying security; gamma, a measurement of how fast delta changes; kappa, a value representing the expected change in the price of an option in response to a 1% change in the volatility of the underlying stock. A set of these sensitivities comprise risk for the deal or transaction. Calculating the risk may be necessary to determine exposure to the various market forces of the deal or transaction, which in turn assists in determining an effective hedging strategy.

The current trend in the financial industry is to book deals or transactions across various business units to accurately track the risk involved in the deal as well as effectively hedge the deal. As the deals become more complex, the mathematical functions used to model them become more complex. As deals expand, the inputs into the mathematical function become more complex. The result is that the computation of sensitivities becomes more complex, thus leading to complex risk calculations. In some instances, many deals are rolled up into one book or many books. It may be necessary to compute the sensitivity of the book to one market observable, thereby measuring the sensitivity of several deals across one market observable. Such a process is known in the industry as aggregate risk reporting.

This complexity demands integration of IT systems across various product lines. In some instances, the demands are being met by a variety of ad-hoc solutions which include double booking by traders of trades into two different systems or developing special hybrid programs to extract risk data from one system and reformat it for another, for example. If the demands are not met, traders may be prevented from doing cross-product trades because of lack of system support.

Many financial services firms employ relational databases to handle storing the various parameters related to deals or transactions. However, many of these systems may not be robust enough for risk reporting. A typical trader may need to view the risk for all products in a book aggregated together, as noted above. The task is complicated by the fact that the risk numbers for different products need to be converted to a compatible format, and the different traders may want different formats for the same product. For example, a swap trader may want to see interest rate risk for both swaps and bonds against a LIBOR yield curve, while a bond trader may want to see both of them against bond yields.

A typical relational database may not be easily scalable to support permutations of the sensitivity analysis for various business units and therefore may preclude proper risk reporting. This may lead to various business units programming separate databases to support their needs. As this occurs, the financial services firm loses its ability to integrate and aggregate across product lines in an efficient manner. This leads to improper risk reporting and an inability to hedge large books in a timely manner.

SUMMARY

In various embodiments of the present invention, a method for capturing risk calculation results for an investment portfolio is provided. The method comprises storing information concerning at least one investment instrument in a database and accepting computed risk information by multiple users and multiple systems associated with the at least one investment instrument. The method further comprises creating at least one risk table in the database, storing the risk information in the risk table, and applying name/value pair approach to the risk information in the risk table.

In another embodiment of the present invention a system for managing risk information related to an investment is provided. The system comprises a data input device for receiving information related to at least one investment instrument and a storage device for storing the at least one information. The system further comprises a processor for accepting computed risk information by multiple users and multiple systems associated with the at least one investment instrument, creating at least one risk table in the database, storing the risk information in the risk table, applying name/value pair approach to the risk information in the risk table. The system further comprises a data output device for generating first output information from the processor.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DESCRIPTION OF THE FIGURES

FIGS. 3A-3D illustrate tables for storing risk information according to various embodiments of the present invention.

DETAILED DESCRIPTION

Figure 1:
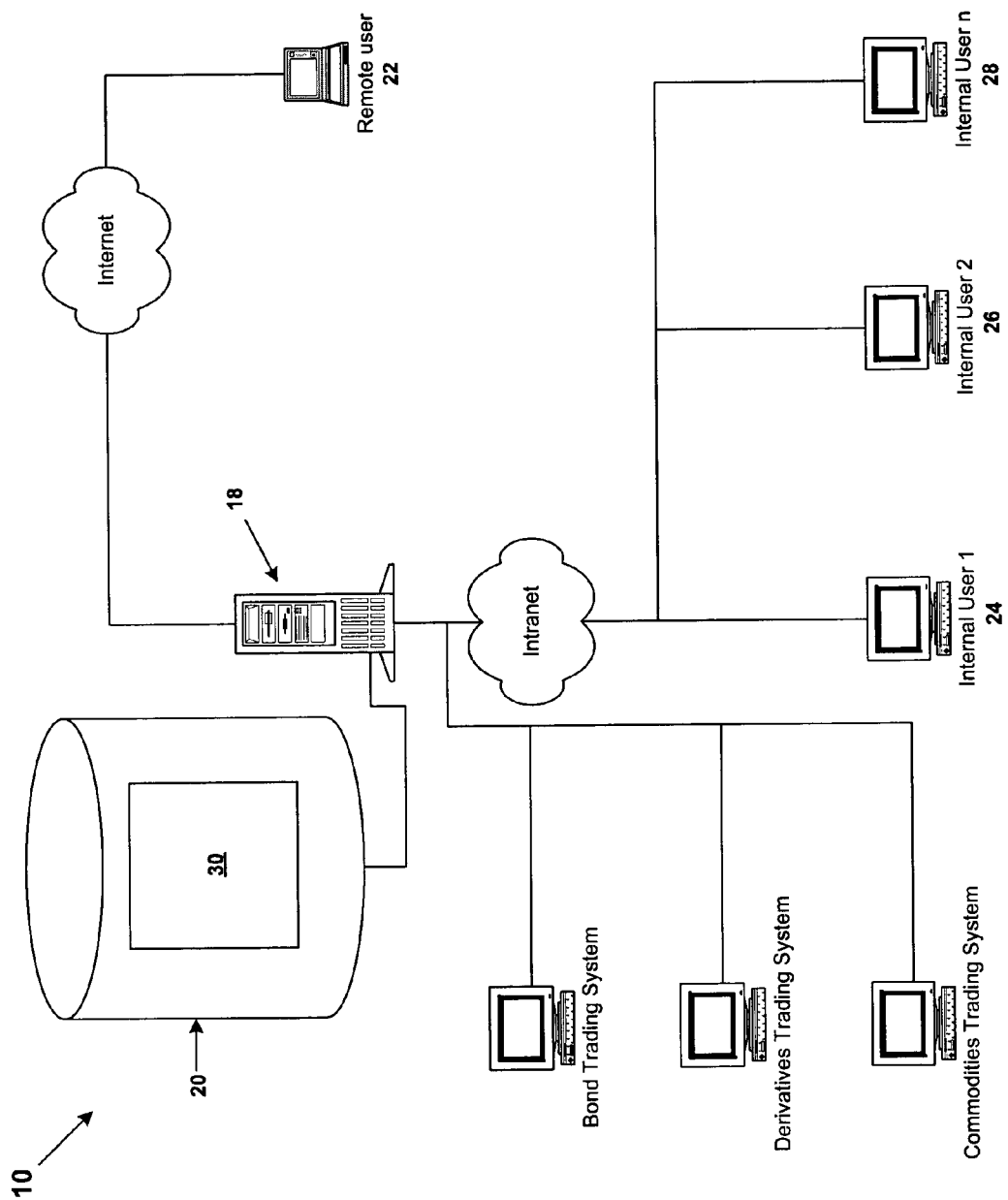
FIG. 1 is a diagram illustrating a system for operating a transactional risk reporting engine according to one embodiment the present invention.

FIG. 1 is a block diagram showing one embodiment of a system 10 for collection of information which can be, for example, deal or transaction information. The deal or transaction therefore may be entered into a database 20 through input devices 22, 24, 26, 28. The input devices 22, 24, 26, 28 may be, for example, optical scanners, graphical user interfaces residing on a PC, etc. The database 20 resides on or is in communication with a server 18 and contains tables 30 that store a plurality of information. The information is associated with individual deals or transactions. The database 20 may be a commercial database such as Sybase, IBM's Universal DB2 Database v8.1, Microsoft's SQL Server 7.0, etc.

The database 20 is capable of sorting, indexing and generating reports through output devices (not shown) which may be, for example, a CD writer, a printer, a display on a PC, etc. The database 20 includes a high-capacity storage medium configured to store market information, deal information, risk information, etc. In one aspect, the database 20 is configured as a set of high speed, high-capacity hard drives, such as organized into a Redundant Array of Inexpensive Disks (RAID) volume, for example. However, any form of volatile storage, nonvolatile storage, removable storage, fixed storage, random access storage, sequential access storage, permanent storage, erasable storage, etc. would be equally suitable.

In one embodiment of the present system and method, computed risk data may be in the form of: scalar data, vector data, matrix data or higher order structure. Scalar data contains one value per product such as bond duration or sensitivity to a parallel shift of a yield curve (parallel delta). This data may be presented as a grid with one row per product, and one column per calculated value. Vector data contains one-dimensional vector of values per product. An example of vectors includes partial deltas of interest rate swaps against the inputs of a corresponding LIBOR yield curve, as is known in the art. Matrix data contains a two-dimensional matrix of values per product. An example includes kappa reports for options against a two-dimensional volatility grid.

In one embodiment of the present method and system, the data is stored in tables in a relational database 20. The present system and method includes a core set of tables that enable storage of key data sets necessary to store and identify risk in a parametric and unambiguous way. To accommodate scalability across various business units within a financial services firm, each specific instance of the transactional risk reporting engine will include additional tables with additional fields to support custom filtering at the business unit level. The core set of tables fall into three categories: tables to capture financial position descriptions and their business risk management hierarchy; risk definition tables to describe risk calculations and types of market data used to perform the risk calculations; and, tables to take a snapshot or slice of calculated values.

Figure 2:
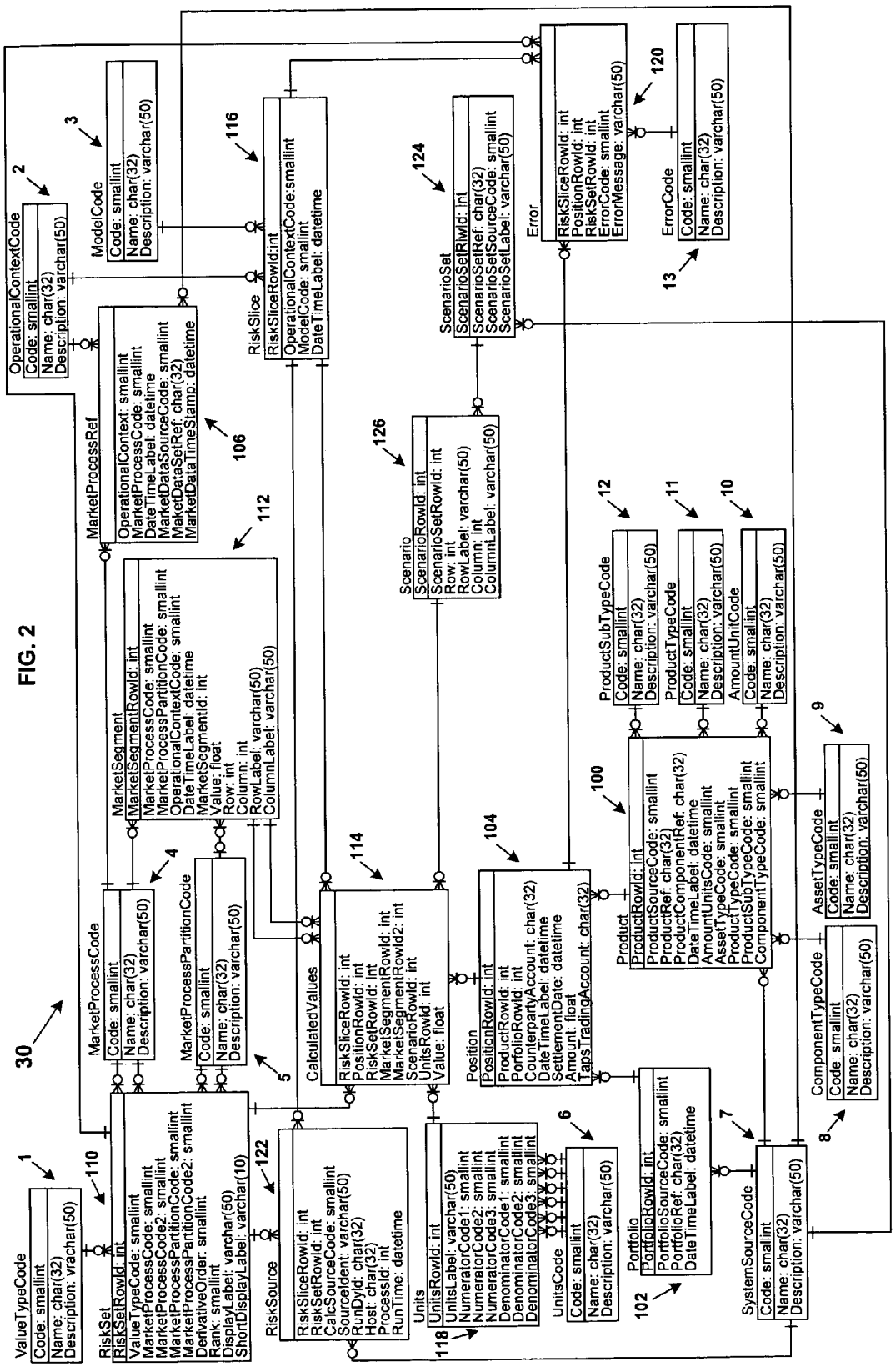
FIG. 2 depicts a database table schema for storing risk information according to one embodiment the present invention.

FIG. 2 illustrates the table 30 discussed in FIG. 1. The Product table 100 in one embodiment of the present method and system identifies and stores information regarding OTC or listed products by a combination of an identifier and the source fields. The Product table 100, in one embodiment includes several fields. The ProductRowId field is a unique identifier for each row of the table, and is used internally within the transactional risk reporting engine as a key for joining to other tables. The ProductSourceCode field may be assumed to have values from an enumerated list, identifying the particular booking system instance which contains the complete contractual description of the product. For bonds, it may be expected to receive indicative data e.g. start date, end date, coupon rate, etc. from such sources as Bloomberg or some internal database containing bond information. For interest rate swaps it may be a swap trading system installation. The ProductRef field is the source system identifier of the product, within the ProductSourceCode system. ProductRefs may be unique within a single ProductSource, but do not have to be unique across sources. The ProductComponentRef is the source system identifier of the components of the product. For example, for plain interest rate swaps, each leg of the swap would be a separate component.

The DateTimeLabel field is the date (optionally the time) for which the Product definition is valid. This may be needed to store risk calculations for multiple dates. The AmountUnitsCode field is the unit in which the product amounts are expressed. For financial products, the AmountUnit is currency. For commodities such as oil, AmountUnit may be barrels or metric tons. The AssetTypeCode field expresses the denomination of the component. For financial products this is the currency code (e.g., U.S. Dollars "USD," Euros "EUR," British Pounds "GBP," etc.). For commodities, it is oil, gold, power, etc. The ProductSubTypeCode field allows one additional level of classification within each ProductType. Examples of ProductSubTypeCodes are types of bonds, such as Treasury, Agency, Corporate or single/cross currency Swaps for interest rate swaps.

The ComponentTypeCode field identifies the type of each component for products with multiple components. Examples for Swaps are fixed leg, float leg, fee, etc. For dual-currency Bonds, this field may be populated with principal and interest. This table purposely does not provide any more details on the nature of the product. It is assumed that all additional information about a particular product will be stored in a number of "ProductExtra" tables, and these extra tables may be specific to a particular usage instance of the transactional risk reporting engine. For OTC products such as Swaps, this table may contain one record for each leg of the swap; for most securities (such as bonds and futures) there will be one record per security.

The ProductExtra(s) table (not shown) contains additional product attributes needed by a particular business/application to facilitate filtering and aggregation of risk data. Examples of fields in this table could include the industry and the rating for corporate bonds, trade type and currency for derivatives, etc. This table, in one embodiment, is associated with the Product table by the ProductRowId field.

The Portfolio table 102 contains the short description of the portfolio, which may represent the lowest level set of positions. These positions are typically risk managed as a single entity. Other terms used instead of portfolio are book or strategy. Many businesses organize their books into hierarchies. Similar to the Product table, it may be assumed that additional portfolio attributes and the system/instance specifics means of describing portfolio hierarchies are captured in a PortfolioExtra table(s) (not shown). The Portfolio table, in one embodiment, includes several fields. The PortfolioRowId field is a unique identifier of the row in the database (see ProductRowId field description above). The DateTimeLabel field contains the date for which the portfolio record is valid, utilized for storing risk for multiple dates. The PortfolioSourceCode field contains an identifier of the system in which the portfolio identifier was generated (see ProductSource- Code field description). The PortfolioRef field is the identifier of the portfolio within the PortfolioSource system (see ProductRef field description).

The Position table 104 captures a position description of a product in a portfolio. The PositionRowId field is a unique identifier of this row in the database (see ProductRowId field description above). The ProductRowId identifies for which product this position is taken (associated with the Product table). The PortfolioRowId identifies for which portfolio the position is associated with (joins to Portfolio table). The CounterpartyAccount field is used for OTC products, specifically the counterparty account number against which the position is taken. The SettlementDate field is null for most positions. For forward-settled bond positions it is set to the settlement date of this position. The DateTimeLabel field stores the date for which the position record is valid. This may be needed to store risk for multiple dates. The Amount field captures the size (total notional) of the position. It may be assumed that a single product is based on a single currency, otherwise it may be necessary to break the product into two or more product components. For instance, cross-currency swaps must be captured as two separate products/components. The same may be true for dual-currency bonds. The TradingAccount is the identifier that points to an account within the accounting system containing books and records of the firm to which this position rolls up.

The MarketProcessRef table 106 contains pointers to the actual market data/parameter information used in a particular risk snapshot or slice calculation. MarketProcessRef table 106 refers only to the market process with respect to which the position sensitivities are calculated, not to the complete set of market data needed to price a trade. The OperationalContextCode field describes which operational context for which the market process was used (associated with the OperationalContext table). The MarketProcessCode field is the market process whose sensitivities are calculated. This identifies the financial concept, not the specific market data. For example, for purposes of illustration, assume that to price a trade, an investment firm discounts future cashflows using the LIBOR yield curve in USD. In that case, the MarketProcessCode is "yield curve", and USD LIBOR is the market data set used to implement the yiedcurve. It is noted that the MarketProcessCode is part of an enumerated list. The MarketProcessCode field joins to the RiskSet table 110. The DateTimeLabel identifies the date for which the calculation is performed in this operational context. For example, if two slices of risk are taken for Oct. 28, 2003 and for Oct. 29, 2003, the market data for each of these slices would be distinguished by the DateTimeLabel. The MarketDataSourceCode is the source system which provides the market data set used to implement the MarketProcess (see ProductSourceCode field description). The MarketDataSetRef is the identifier of the market data set in the MarketDataSourceCode system that is used to implement the MarketProcess (see ProductRef field description). The MarketDataSetTimeStamp is the timestamp of the market data set in the MarketDataSource system that is used to implement the MarketProcess. Together, the three fields, MarketDataSourceCode, MarketDataSetRef, and MarketDataSetTimestamp uniquely identify the exact market data set used to implement the MarketProcess, and these fields are used generally to match up to the market data in the source system.

The OperationalContext table (not shown) captures the operational purpose of a particular slice of risk numbers, which allows for multiplicity of risk information for one set of numbers for a position. Operational context, a portfolio, and a risk slice time stamp uniquely define a set of market data used for the risk slice calculations. The OperationalContextCode field is a unique identifier of this row in the database (see ProductRowId field description). The OperationalContextName field is a descriptive text name of the operational context. The OperationalContextSource field is a source system for operational context. The IsEOD is a Boolean variable describing whether this context contains End-Of-Day values. The IsPublicContext field is a Boolean variable describing whether this context is for private individual use or shared use. The IsOfficial field is a Boolean describing whether this context contains official values. The Owner field is a text field containing the user identification ("userid") of the owner of the data (for private contexts).

The RiskSet table 110 contains a list of all risk/sensitivity types computed and stored as a unit, together with the market processes which are perturbed or varied to calculate these sensitivities. An example is a calculation type "partial IR delta" which would denote specific partial delta calculations with respect to the individual points on a swap yield curve. Two MarketProcessCode fields are needed to capture second derivatives. (In case of a first derivative, the MarketProcessCode2 field would be null). The RiskSetRowId is a unique identifier for each row of the table (see ProductRowId field description above). The ValueTypeCode identifies the type of data for which the value or derivative is stored. Examples include present value, realized value, yield and price. In many instances, for most greek values (Delta, Kappa, Gamma), the ValueTypeCode is a present value, because these greek values are derivatives of the present value. For Duration, the ValueTypeCode is price. The DerivativeOrder field may be zero for outright values (present value, realized value, price and yield), one for first derivatives (Delta, Kappa) and two for second derivatives (Gamma). The MarketProcessCode(2) identifies the one or two market processes used in the risk/sensitivity calculations. Note that the RiskSet table 110 by itself may not uniquely resolve the actual instance of the market data sets ("USD LIBOR" or "JPY LIBOR" yield curves in the example above) used in the calculations. There are two MarketProcess fields to accommodate up to a second derivative RiskSet, which represents sensitivities of up to two discrete market processes. The MarketProcessPartition(2) field represents the manner by which the market data set(s) are perturbed for the desired sensitivity calculations. As an example, it is possible to calculate the interest rate delta ("IRD") to a yield curve as a single parallel delta (the sensitivity of a particular portfolio to a parallel shift of all inputs to the yield curve), as a set of partial deltas (a separate sensitivity to each input that the yield curve is composed of), or by sector deltas (separate sensitivities to the short, medium, and long inputs of the yield curve). In each of these cases, the market process is the same, but the different calculations are distinguished by the market process partition. The Rank is the linear algebraic rank of the calculated results: 0=Scalar (PV, dP/dy, . . . ); 1=Vector (partial deltas); 2=Matrix (volatility grid, kappas, 2nd derivatives). The DisplayLabel field is a string to display the name for risk numbers in this set. In one embodiment, it may be assumed to be generated by the applications code based on the unique logical keys for the table. A sample display label might be "Partial yield curve deltas." The ShortDisplayLabel field is used to store an abbreviated display label, suitable for use as a column name, etc.

The MarketSegment table 112 describes the segments into which the present method and system divides the market process for risk calculations. For example, for a partial delta risk set type for a yield curve (YC) with thirty inputs, the calculation consists of separately perturbing each of the thirty inputs; this table would contain thirty rows, all linked to the same row in the RiskSet table. It is also possible to define a delta calculation for the same YC containing only two perturbations, for the short and long rates on the YC, instead of thirty. This represents a different partition of the same YC (partitioning the thirty YC inputs into two segments). For scalar data, there may be one row for each risk set. Note that the actual number of rows in this table for every risk set depends on the particular instance of the market data set used in the particular risk slice calculation. For example, if the operational context points to an actual "USD LIBOR" yield curve with thirty input points, then the table will have thirty rows for the partial IR delta USDLIBOR risk set entry. If the entry in MarketProcessRef field points to a yield curve with twenty-five points, then the table will have twenty-five elements, etc. The risk set contents, however, are unaffected by these changes in value (the risk set is still a single row for partial IR delta for USD discounting risk). This is due to the structure of one embodiment of the present method and system such that the MarketSegment table 112 is associated with the OperationalContext table (not shown), but the risk set does not.

In one embodiment of the present method and system, the MarketSegment table 112 contains the following fields. The MarketSegmentRowId is a unique identifier for this row in the database (see ProductRowId). The MarketProcessCode is the identifier for the market segment of which the particular entry is a part (functionally joins to MarketProcessRef). The OperationalContextCode describes for which operational context this market process was used (joins to OperationalContext table (not shown), and to MarketProcessRef table 106). The DateTimeLabel identifies the date associated with the market process (associated with the MarketProcessRef table 106). The three fields of MarketProcessCode, OperationalContextCode, and DateTimeLabel create a join to the MarketProcessRef table 106. The MarketSegmentId identifies the particular market segment within the defined market process. For example, a partial IR delta calculation with thirty inputs would have thirty market segment ids, zero through twenty-nine. The value stored in the MarketSegmentPartitionCode field identifies the partition of the market process. (Note that this value is already implied by pointer to the RiskSet table 110, and is only included here for informational purposes.) The Value field contains the value of the market data factor/parameter in the base (unperturbed) state, which may be used for the market-to-market calculations. While this value may generally be determined by following the links in the MarketProcessRef table 106, storing it in the MarketSegment table 112 provides for convenient optimization (primarily for use in P&L attribution). The Row,Column field captures the two-dimensional structure of risk numbers for a given risk set, and is used to layout the results on a user risk report in the correct position. The RowLabel,ColumnLabel fields capture the labels used to display rows and columns in the risk report page for a two-dimensional RiskSet. Storage of information in these fields may be redundant for most of the two-dimensional cases, as all that may be necessary is "M" labels for rows and "N" labels for columns equating to M+N labels.

The CalculatedValues table 114 stores the actual risk/sensitivity numbers. All of its key fields (keys) have been described above. The Value field contains the risk/sensitivity number for a particular combination of the above described keys. This may result in a large table with potentially hundreds of thousands of rows in it. The table is comprised of the following fields. The RiskSliceRowId identifies the RiskSlice to which the field value calculation pertains (associated with the RiskSlice table 116). The PositionRowId identifies the row in the Position table 104 associated with the particular calculated value (associated with the Position table 104). The RiskSetRowId identifies the risk set to which this particular calculated value pertains (associated with the RiskSet table 110). The MarketSegmentRowId(2) identifies the market segment (or segments, in the case of a second derivative) to which this calculated value pertains (associated with the MarketSegment table 112). The ScenarioRowId field, in the case of a scenario calculation, identifies the scenario to which this value pertains. The Value field contains the calculated value (stored as a double). The UnitsRowId field describes the units of the calculated values (associated with the Units table 118).

The Error table 120 is used to store error codes for the situation where the calculations for a position could not be performed because of bad or missing data, such as a bond with a bad mark, or a swap missing a rate setting. The error table 120, in one embodiment, is not designed to handle errors caused by system problems (e.g., software bugs, memory errors, hardware failures, etc.). The RiskSliceRowId identifies the risk slice to which this error pertains (associated with the RiskSlice table 116). The PositionRowId identifies the position to which this error pertains (associated with the Position table 104). The RiskSetRowId identifies the risk set to which this error pertains (associated with the RiskSet table 110). The ErrorCode field contains the actual error code (generated from an enumerated list). The ErrorMessage field contains a text error message describing the error.

The RiskSlice table 116 describes a consistent "slice" of risk, based on operational context and a date/time label. For example, all results for the end-of-day operational context for Oct. 28, 2003 would represent a single risk slice. Within a slice, values can be safely aggregated without double-counting data. The RiskSlice table 116 is comprised of the following fields: the RiskSliceRowId uniquely identifies the rows of the table (see ProductRowId described above); the OperationalContextCode identifies the operational context for which this particular risk slice is computed (associated with the OperationalContext table (not shown)); the ModelCode identifies the financial model used to calculate this risk slice; and the DateTimeLabel is the timestamp for the time at which the data in a particular risk slice was gathered.

The RiskSource table 122 is used to store information about which system/program (e.g. program used by commodities business unit) inserted a risk set into the transactional risk reporting engine. This table may be useful for auditing and debugging the data in the transactional risk reporting engine. The RiskSliceRowId field uniquely identifies each row of this table (see ProductRowId). The RiskSetRowId identifies the risk set for which this error is generated (associated with the RiskSet table 110). The CalcSourceCode field contains the name of the system that ran the calculation. The SourceIdent field contains the character string to identify the executable program that performed the calculation. The Host field contains the name of the machine on which the calculation was run. The ProcessId field contains the identifier of the process that performed the calculation. The RunById field contains the username of the person who launched the calculation.

The Units table 118 describes the units of calculated values. In one embodiment the units of calculated values are all based on currencies. The calculated values are, in one embodiment, sensitivities of the position's market value to changes in the underlying market factors. The calculated values are measured in units that are ratios of market value units (for a given currency) to the first or second order units of the underlying market factors (for the first order or second order derivatives). Market Factor units may then in turn be, in the most complex case, ratios of one currency over another e.g. an FX rate. In a complex example, the Units Table may contain 3 units (currencies) in the enumerator and 3 currencies in the denominator. The UnitsRowId uniquely identifies the rows of the table (see ProductRowId described above). The UnitsLabel field displays the label for the units.

The ScenarioSet table 124 is used to store the results of scenario analysis calculations. This table describes a set of individual scenarios (the individual scenarios are represented in the Scenario table 126) which are calculated together and grouped together for reporting purposes. For example, if a user runs a simple yield curve (YC) scenario analysis, with scenarios for YC shifted by −100, −50, −10, 0, 10, 50, 100 basis points each, then the ScenarioSet table 124 would contain a single row, and the Scenario table 126 would contain seven rows (row 1 for the −100 scenario, row 2 for the −50 scenario, etc). The table, in one embodiment, is comprised of the following fields: the ScenarioSetRowId field uniquely identifies the rows of the table (see ProductRowId described above); the ScenarioSetRef field displays labels for the units; the ScenarioSetSourceCode is the system (particular business unit program) in which the scenario was generated; and the ScenarioSetLabel field contains a label describing the scenario set (this label may be chosen by the user).

The Scenario table 126 describes the individual scenarios that make up a scenario set (see ScenarioSet table 124). The table contains the following fields: the ScenarioRowId field uniquely identifies the rows of the table (see ProductRowId described above); the ScenarioSetRowId field refers to the scenario to which the particular set belongs; the Row,Column field captures, in one embodiment, the two-dimensional structure of the scenarios in a given ScenarioSet, and is used to display the results on a user risk report in the correct position; and the RowLabel,ColumnLabel field captures the labels used to display rows and columns in the scenario analysis for a potentially two-dimensional scenario set.

In operation, the various tables are related by links identified by a user as described above and depicted in FIG. 2. As the number of deals or transactions grow, it may become necessary for the database to scale to meet these demands. In one embodiment, it may be necessary to compute many different risks across various business units.

As the ability to measure and model certain market observables increases, the need to calculate risk based on these observables increases. To accommodate this, a database should scale to meet this requirement. In one instance, as shown above, the RiskSet table accommodates various greek values (delta, gamma, etc.) based upon the desired sensitivity analysis. Referring to FIG. 3A, a Riskset table is shown where each greek value is associated with a particular TradeID 140. To add more sensitivities to a particular risk for a given deal or trade, it becomes necessary to add another column to the row identified with a particular deal or trade. Referring now to FIG. 3B, the greek value theta 142 is added as another column onto the Riskset table of FIG. 3A. As stated above, as the ability to model market behavior proliferates, the database should scale to meet it. Following the above approach, it may be difficult to scale the database to meet the need.

Also, the manner with which a particular sensitivity is represented in the database is implicit. That is, a particular sensitivity may be a delta computation, but there is no way of knowing which market factor is perturbed to compute the particular delta value, for example. Therefore, a name is associated with the sensitivity, but there is no way to explicitly define it. For example, multiple systems from disparate business units send data identified only by name only. In each respective business unit, that name may have significance, but when attempting to aggregate this information, it becomes nearly impossible to match the data from various business units. This inability to match up common sensitivity factors prevents full-scale risk aggregation across business units.

To prevent a table from becoming unmanageable and to explicitly define various sensitivities comprising a risk analysis, a name/value pair approach is applied to the risk data. As demonstrated in FIG. 3C, the name/value pair is keyed to a specific trade or deal identifier ("Trade ID") 140 in the table, which allows for tracking of certain information stored in the table. To accommodate the scalability/expandability and matching requirements set forth above, the Trade ID 140, RiskType 142, RiskType value 144 and the market factor that is perturbed to compute the particular risk, MarketFactorId 146, are written to a separate table 141. If a business unit desires to add new risk types for a specific deal or trade, rather than adding another column to the RiskSet table 110 to accommodate the new risk type (theta) or sensitivity 142 depicted in FIG. 3B, the information for a particular deal is written to the name/value pair table where it is associated with a particular deal or trade identifier as depicted in FIG. 3D, items nos. 146, 147 and 148. This table structure also allows for identification of sensitivity calculations performed on the same market factor thus permitting aggregation of the various sensitivities or risks across deals, trades or business units.

This use of a separate table keyed on the name/value pair allows users from various business units to record particular market factor sensitivities regarding a particular deal in one central location which permits aggregation of this information in a rapid and efficient manner. This rapid and efficient aggregation allows an investment firm to capture data across all of the involved business units.

Although the example in FIG. 3D depicts only four columns, it is understood that the present system and method may by expanded to accommodate multiple variables that comprise a sensitivity or risk analysis. The sensitivity or RiskType 142 may be associated with several market factors, making expansion of the table necessary to accommodate such requirements.

The term "computer readable medium" is defined herein as understood by those skilled in the art. A computer readable medium can include, for example, memory devices such as diskettes, compact discs of both read-only and writeable varieties, optical disk drives, and hard disk drives. A computer readable medium can also include memory storage that can be physical, virtual, permanent, temporary, semi-permanent and/or semi-temporary. A computer readable medium can further include one or more data signals transmitted on one or more carrier waves.

It can be appreciated that, in some embodiments of the present methods and systems disclosed herein, a single component can be replaced by multiple components, and multiple components replaced by a single component, to perform a given function. Except where such substitution would not be operative to practice the present methods and systems, such substitution is within the scope of the present invention.

Examples presented herein are intended to illustrate potential implementations of the present method and system embodiments. It can be appreciated that such examples are intended primarily for purposes of illustration. No particular aspect or aspects of the example method and system embodiments, described herein are intended to limit the scope of the present invention. One skilled in the art would readily recognize that the present systems and methods have uses outside the commercial loan arena and none of the embodiments presented above are meant to limit the scope of applications of the present methods and systems.

What is claimed is:

1. A method for capturing risk calculation results for a plurality of derivative instruments of an investment portfolio, the method comprising:
   storing data identifying the plurality of derivative instruments in a products table in a database;
   storing data in a risk factor table of the database that identifies a plurality of risk measures for the plurality of derivative instruments;
   generating for each of the plurality of derivative instruments one or more rows in a calculated values table in the database wherein generating the one or more rows of the calculated values table comprises for each of the one or more rows:
      receiving and storing, in a first field of the row of the calculated values table, a product identifier that identifies one of the plurality of derivative instruments that is linked to the products table;
      receiving and storing, in a second field of the row of the calculated values table, a risk measure identifier that identifies one of the plurality of risk measures that is linked to the risk factor table, wherein the risk measure identifier in the second field is the only risk measure identifier in the row;
      receiving and storing a market factor identifier in a third field of the row of the calculated values table;
      receiving and storing, in a fourth field of the row of the calculated value table, a risk measure value for the risk measure identified in the second field of the row, wherein the market factor identifier of the third field identifies a market factor perturbed to compute the risk measure value in the fourth field, wherein the risk measure value in the fourth field is the only risk measure value in the row, and wherein, for each of the plurality of derivative instruments, the one or more rows in the calculated values table have a unique combination of risk measure identifier in the second field and market factor identifier in the third field, such that for each derivative instrument, no two rows in the calculated values table have the same combination of risk measure identifier in the second field and market factor identifier in the third field;
   generating aggregate risk information, by a computer device that is in communication with the database, by aggregating two or more risk measure values in the calculated values table across two or more of the plurality of derivative instruments; and
   outputting by the computer device the aggregate risk information.

2. The method of claim 1, wherein the database is a relational database.

3. A system for managing risk information related to an investment, comprising:
   a database for storing risk information related to a plurality of derivative instruments in a plurality of tables, wherein the plurality of tables comprises:
      a products table that comprises data identifying the plurality of derivative instruments,
      a risk factor table that comprises data identifies a plurality of risk measures for the plurality of derivative instruments, and
      a calculated values table that comprises one or more rows for each of the plurality of derivative instruments;
   a computer device that is in communication with the database, wherein for each of the rows of the calculated values table the computer device is programmed to:
      receive and store, in a first field of the row of the calculated values table, a product identifier that identifies one of the plurality of derivative instruments that is linked to the products table;
      receive and store, in a second field of the row of the calculated values table, a risk measure identifier that identifies one of the plurality of risk measures that is linked to the risk factor table, wherein the risk measure identifier in the second field is the only risk measure identifier in the row;
      receive and store a third field a market factor identifier in a third field of the row of the calculated values table;
      receive and store, in a fourth field of the row of the calculated value table, a risk measure value for the risk measure identified in the second field of the row, wherein the market factor identifier of the third field identifies a market factor perturbed to compute the risk measure value in the fourth field, wherein the risk measure value in the fourth field is the only risk measure value in the row, and wherein, for each of the plurality of derivative instruments, the one or more rows in the calculated values table have a unique combination of risk measure identifier in the second field and market factor identifier in the third field, such that for each derivative instrument, no two rows in the calculated values table have the same combination of risk measure identifier in the second field and market factor identifier in the third field;
      aggregate two or more risk measure values in the calculated values across two or more of the plurality of derivative instruments; and
      output the aggregate risk information.

4. The system of claim 3, wherein the database includes a relational database.

5. The system of claim 3, wherein the risk information is transferred electronically to the storage device.

6. The method of claim 1, wherein at least one of the plurality of derivative instruments comprises an option.

7. The method of claim 1, wherein at least one of the plurality of derivative instruments comprises a swap contract.

8. The method of claim 7, wherein the swap contract comprises a swap contract selected from the group consisting of an interest rate swap and a currency swap.

9. The system of claim 3, wherein at least one of the plurality of derivative instruments comprises an option.

10. The system of claim 3, wherein at least one of the plurality of derivative instruments comprises a swap contract.

11. The system of claim 10, wherein the swap contract comprises a swap contract selected from the group consisting of an interest rate swap and a currency swap.

12. The method of claim 1, wherein the plurality of tables further comprises a market factor table that comprises a plurality of market factors, and wherein the market factor identifier in the third field of the calculated values table is linked to one of the market factors in the market factor table.

13. The system of claim 3, wherein the plurality of tables further comprises a market factor table that comprises a plurality of market factors, and wherein the market factor identifier in the third field of the calculated values table is linked to one of the market factors in the market factor table.

* * * * *